(12) United States Patent
Renninger et al.

(10) Patent No.: US 6,915,682 B2
(45) Date of Patent: Jul. 12, 2005

(54) DEVICE FOR DETERMINING AT LEAST ONE PARAMETER OF A MEDIUM FLOWING IN A CONDUIT

(75) Inventors: Erhard Renninger, Markgroeningen (DE); Thomas Lenzing, Benningen (DE); Manfred Fischer, Oppenweiler (DE); Uwe Konzelmann, Asperg (DE); Markus Sippel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/312,296

(22) PCT Filed: Apr. 12, 2002

(86) PCT No.: PCT/DE02/01363

§ 371 (c)(1),
(2), (4) Date: Mar. 14, 2003

(87) PCT Pub. No.: WO02/086425

PCT Pub. Date: Oct. 31, 2002

(65) Prior Publication Data

US 2003/0159501 A1 Aug. 28, 2003

(30) Foreign Application Priority Data

Apr. 20, 2001 (DE) ......................................... 101 19 699
Jul. 19, 2001 (DE) ......................................... 101 35 142

(51) Int. Cl.⁷ .............................................. G01F 1/86
(52) U.S. Cl. ....................................... 73/118.2; 73/202
(58) Field of Search ............................... 73/116, 117.2, 73/117.3, 118.1, 118.2, 119 R, 861.01, 202, 202.5

(56) References Cited

U.S. PATENT DOCUMENTS

| | | |
|---|---|---|
| 3,314,290 A | 4/1967 | Peranio |
| 4,403,506 A | 9/1983 | Lauterbach |
| 4,887,577 A | 12/1989 | Arai et al. |
| 4,914,947 A | 4/1990 | Davidson |
| 5,467,648 A | 11/1995 | Igarashi et al. |
| 5,712,425 A * | 1/1998 | Hecht et al. ............... 73/118.2 |
| 5,948,975 A * | 9/1999 | Mueller et al. ............ 73/118.2 |
| 6,148,663 A | 11/2000 | Stahl et al. |
| 6,272,920 B1 * | 8/2001 | Tank et al. ............... 73/204.22 |
| 6,345,531 B1 * | 2/2002 | Mueller et al. .......... 73/204.22 |
| 6,422,070 B2 * | 7/2002 | Reymann et al. .......... 73/118.2 |
| 6,557,408 B1 * | 5/2003 | Mueller et al. ............ 73/202.5 |
| 6,722,196 B2 * | 4/2004 | Lenzing et al. .......... 73/204.21 |
| 2001/0025526 A1 * | 10/2001 | Reymann et al. .......... 73/118.2 |
| 2003/0046977 A1 * | 3/2003 | Lenzing et al. ............ 73/23.32 |
| 2003/0089168 A1 * | 5/2003 | Lenzing et al. ............ 73/202.5 |
| 2004/0074291 A1 * | 4/2004 | Lenzing et al. ............ 73/118.1 |

FOREIGN PATENT DOCUMENTS

| | | |
|---|---|---|
| DE | 196 23 334 | 12/1997 |
| DE | 198 15 654 | 10/1999 |
| EP | 0 369 592 | 5/1997 |
| EP | 1 091 195 | 4/2001 |
| JP | 2000 304 585 | 11/2000 |
| WO | WO 99 53274 | 10/1999 |

\* cited by examiner

*Primary Examiner*—Eric S. McCall
(74) *Attorney, Agent, or Firm*—Kenyon & Kenyon

(57) ABSTRACT

A device for determining a parameter of a medium flowing in a line, according to the related art, does not offer sufficient protection for a measuring element from liquid or solid particles which may dirty or damage the measuring element in an unwanted way. A device has an input region, whence, on the one hand, the flowing medium flows into the measuring channel, and on the other hand, through at least one separation opening, liquid and solid particles flow, and thus flow so as to bypass the measuring channel.

22 Claims, 4 Drawing Sheets

DEVICE FOR DETERMINING AT LEAST ONE PARAMETER OF A MEDIUM FLOWING IN A CONDUIT

This application is application is a 371 of PCT/DE 02/01363 dated Apr. 12, 2002.

FIELD OF THE INVENTION

The present invention relates to a device for determining at least one parameter of a medium flowing in a line.

BACKGROUND INFORMATION

A device is known from German Published Patent Application No. 196 23 334 and U.S. Pat. No. 6,148,663 for determining the mass of a medium flowing in a line in which there is a separation opening in a bypass channel. However, in this device, liquid or solid particles present in the medium first flow past the measuring element, and are able to dirty and damage the latter, so as then partially to flow back through the separation opening into the line.

German Published Patent Application No. 198 15 654 shows a device for determining the mass of a medium flowing in a line in which a separation point is present in the bypass channel. The separation point is formed by a separation wall which subdivides the bypass channel into a measuring channel and a return channel.

U.S. Pat. No. 4,914,947 shows a device for determining the mass of a medium flowing in a line, in which contaminants in the flowing medium are pressed against the outer walls by centrifugal forces, and are thus not supposed to reach the measuring channel. In the case of low flow or decreasing (shutting off the internal combustion engine) flow, particularly liquid particles may, on account of gravity, get as far as the input opening of the measuring channel and thus to the measuring element, which they may dirty.

U.S. Pat. No. 3,314,290 shows a bypass channel of a flow meter which subdivides into two exit channels which open back into a line. The exit opening of the exit channels is, however, positioned in such a way that a medium flowing in the bypass channel leaves the exit opening in a direction parallel to the main flow direction in the line.

U.S. Pat. No. 4,887,577 shows a bypass channel of an air flow meter which subdivides at a separation point into two exit channels, a rounded projection being present at the separation point. However, sensors of the air flow meter are situated unprotected in the bypass channel.

U.S. Pat. No. 5,467,648 shows projections at the outer wall of a measuring housing which are situated upstream from lateral exit openings of a bypass channel in the measuring housing. However, sensors of the air flow meter are situated unprotected in the bypass channel.

U.S. Pat. No. 4,403,506 shows an air-mass flow sensor having a wedge-shaped body, which is situated in a flowing medium and which subdivides the medium into two partial flows.

SUMMARY OF THE INVENTION

By contrast, the device according to the present invention has the advantage that, in a simple way, liquid and or solid particles are not able to reach into the measuring channel.

By this positioning of a separation opening in the bypass channel, optimum protection of a measuring element from liquid or solid particles is achieved.

If a separation point is present in the input region or in the intake port, the medium flowing into the bypass channel can be redirected in an advantageous manner, so that liquid or solid particles flowing into the bypass channel are deflected by the measuring channel intake opening, and therefore do not reach into the measuring channel, but are deflected to the separation opening.

It is of advantage if there is a tear-off edge in an input region of the bypass channel, so that no liquid film can get into the measuring channel via a bypass channel inner wall surface, because the liquid film is detached by the tear-off edge.

So as to improve the measuring result, the measuring channel tapers in the region of the measuring element. If a wedge is present in the downstream region of the input region, in an advantageous manner a better deflection can be achieved of the water particles and solid particles to the separation openings, and it may be avoided that water particles or solid particles collect at a baffle plate in the upstream region.

In addition, by a favorable setting of a suction effect it is achieved that water particles and solid particles are increasingly suctioned from the downstream end of the input region. This happens because at an outer side surface of a measuring housing, upstream from the separation opening, at least one projection is formed at the side surface.

BRIEF DESCRIPTION OF THE DRAWINGS

FIG. 1b shows a section along line B—B in FIG. 1a.

DETAILED DESCRIPTION

Figure 1A:
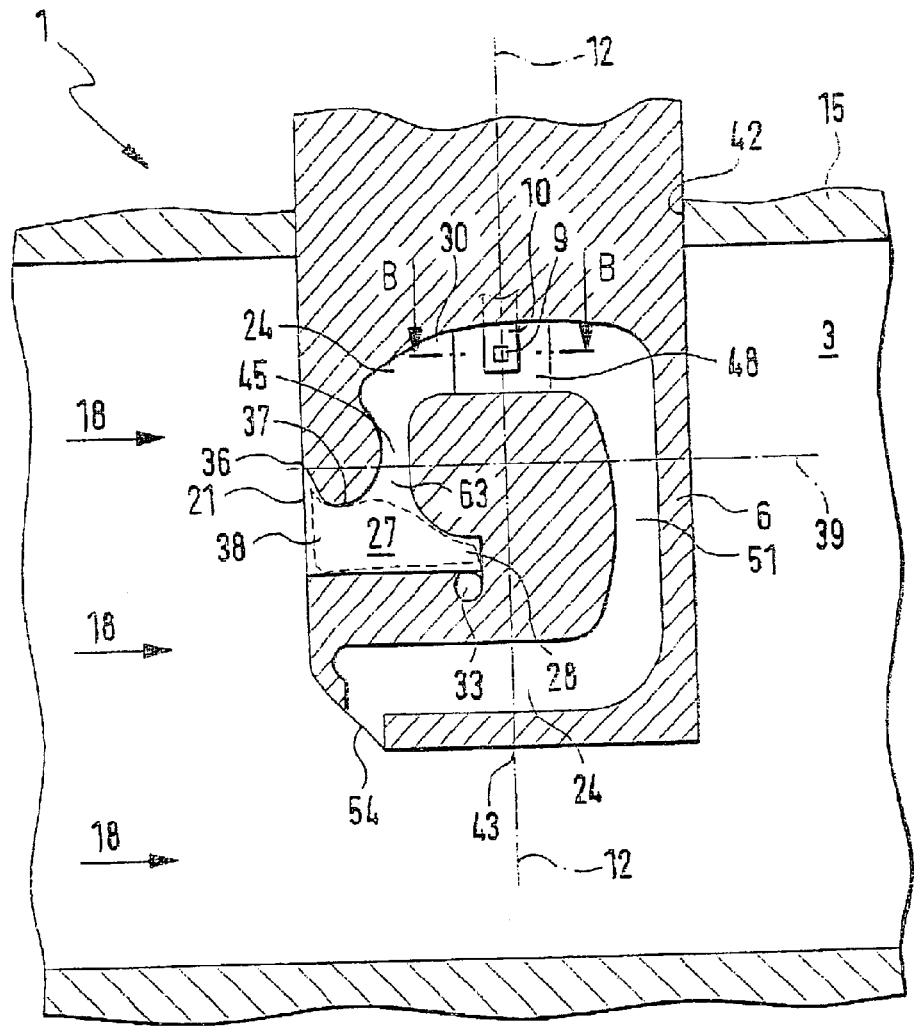
FIG. 1a shows a first exemplary embodiment of a device designed according to the present invention.
Figure 1B:
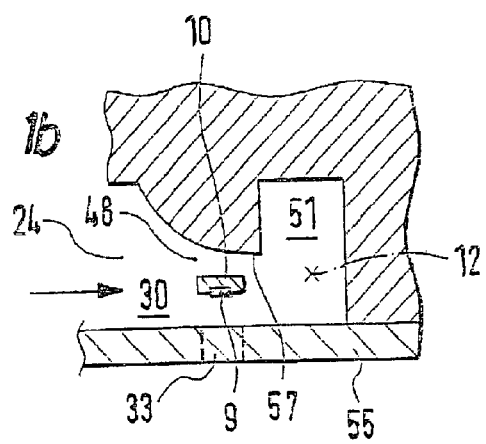

FIGS. 1a and 1b show how a device 1 according to the present invention is built into a line 3, in which the medium flows. Device 1 for determining at least one parameter of the medium is made up of a measuring housing 6 and a carrying part, not shown in detail, in which, for instance, an evaluation electronic mechanism may be accommodated. Measuring housing 6 having the carrier part is inserted into a wall 15 of line 3, through an insertion opening 42, for instance in a pluggable manner. Wall 15 borders a flow cross section of line 3. In this context, the carrier part is, for example, closest to insertion opening 42, the evaluation electronic mechanism being able to lie within and/or outside the flowing cross section of line 3. For example, in device 1 a measuring element 9 on a measuring element carrier 10 is used, which determines as a parameter, for instance, the volume flow of the flowing medium. Additional parameters which may be measured are, for instance, pressure, temperature, a concentration of a medium component or a flow speed, which are determined using suitable sensors. Measuring housing 6 and the carrier part have, for instance, a common longitudinal axis 12 in the axial direction, which, for example, proceeds into line 3 in the insertion direction into device 1, and which, for example, may also be the center axis. The direction of the flowing medium, in the following known as the main flow direction, is indicated in the drawing by corresponding arrows 18, and runs there from left to right.

Measuring housing 6 contains a bypass channel 24 which, for example, has an intake port 21 upstream at measuring housing 6 which is aligned, for example, perpendicular to main flow direction 18. Any other orientation of intake port 21 to main flow direction 18 is conceivable. The medium flows through intake port 21 into bypass channel 24 and there it reaches an input region 27, which is encircled in FIG. 1a by a broken line. Starting from input region 27, the medium reaches exclusively either into a measuring channel 30 which has measuring element 9, or flows through at least one separation opening 33, which is open to line 3. Thus, when the flowing medium reaches input region 27, it divides there completely and exclusively into two partial flows. The first partial flow flows completely into measuring channel 30, and the second partial flow flows completely through at least one separation opening 33. There are no further channels which branch off from the measuring channel. In the flowing medium, for example, liquid particles and/or solid particles are present, which are able to dirty measuring element 9 and/or damage it. Input region 27, at its downstream end 28, has, for example a connection to at least one separation opening 33, through which the liquid and solid particles flow back into line 3. Separation opening 33 is not situated at the downstream end of measuring housing 6. Separation opening 33 lies, for example in the plane of the drawing, i.e. it is situated laterally on measuring housing 6, so that main flow direction 18 runs in the plane in which separation opening 33 is situated. The plane in which separation plane 33 is situated may also be situated at an angle differing from zero degrees to main flow direction 18.

Intake port 21 has an upper boundary edge 36 in axial direction 12, which is closest to measuring element 9, in axial direction 12. An upper plane 39 runs through upper boundary edge 36, as well as perpendicularly to the plane of the drawing and parallel to main flow direction 18. Separation opening 33 is situated below this upper plane 39 in axial direction 12, i.e. facing an axial end 43 of measuring housing 6, in axial direction 12. In the region of intake port 21, bypass channel 24 is, for example, designed by a deflecting taper 38 with the aid of a lip 37 in such a way that the inflowing medium is steered away from upper plane 39. Since the liquid and/or solid particles are larger and have a greater density than the gas-like flowing medium, they move in axial direction 12, away from upper plane 39. Since separation opening 33 is situated below upper plane 39, the liquid and solid particles collect in the region of separation opening 33 and are sucked out into line 3 by the air flowing past in line 3.

Starting from input region 27 downstream from its deflecting taper 38, measuring channel 30 extends, for example, first in axial direction 12 up to insertion opening 42. At the beginning of measuring channel 30, in the vicinity of input region 27, there is a first tapering 45 of measuring channel 30, which has the effect of accelerating the flowing medium, whereby the air is sucked away from input region 27. After first tapering 45, the flowing medium in measuring channel 30 is deflected, and then flows, for instance, approximately in the main flow direction 18 past measuring element 9. In the region of measuring element 9 there is, for example, a second tapering 48 of measuring channel 30. First or second tapering 45 or 48 may be carried out by a narrowing on all sides or a partial narrowing of the side areas of measuring channel 30. Downstream from measuring element 9, the medium flows into a deflecting channel 51, which extends, for example, first in axial direction 12, away from insertion opening 42, then, deflected, for example, in the opposite direction to main flow direction 18, and finally opens out into line 3 at an exit opening 54, which is, for example arranged to be perpendicular to main flow direction 18 or at an angle to main flow direction 18 different from zero degrees. Measuring channel 30 and deflecting channel 51 are also, for example, designed C-shaped, the opening of the C shape facing main flow direction 18.

FIG. 1b shows, in a section along line B—B of FIG. 1a, the region around measuring element 9. Second tapering 48 is achieved in that, for example, a wall 57 of measuring channel 30 narrows, for example, in the flow line, the cross section of measuring channel 30. Downstream from measuring element 9 the cross section of measuring channel 30 becomes abruptly larger. Thereafter the medium flows in axial direction 12 into deflecting channel 51. Measuring housing 6 is closed, for example, by a plate 55, which has an additional separation opening 33, as seen in a direction perpendicular to the plane of the drawing, opposite separation opening 33 that is shown.

Figure 2:
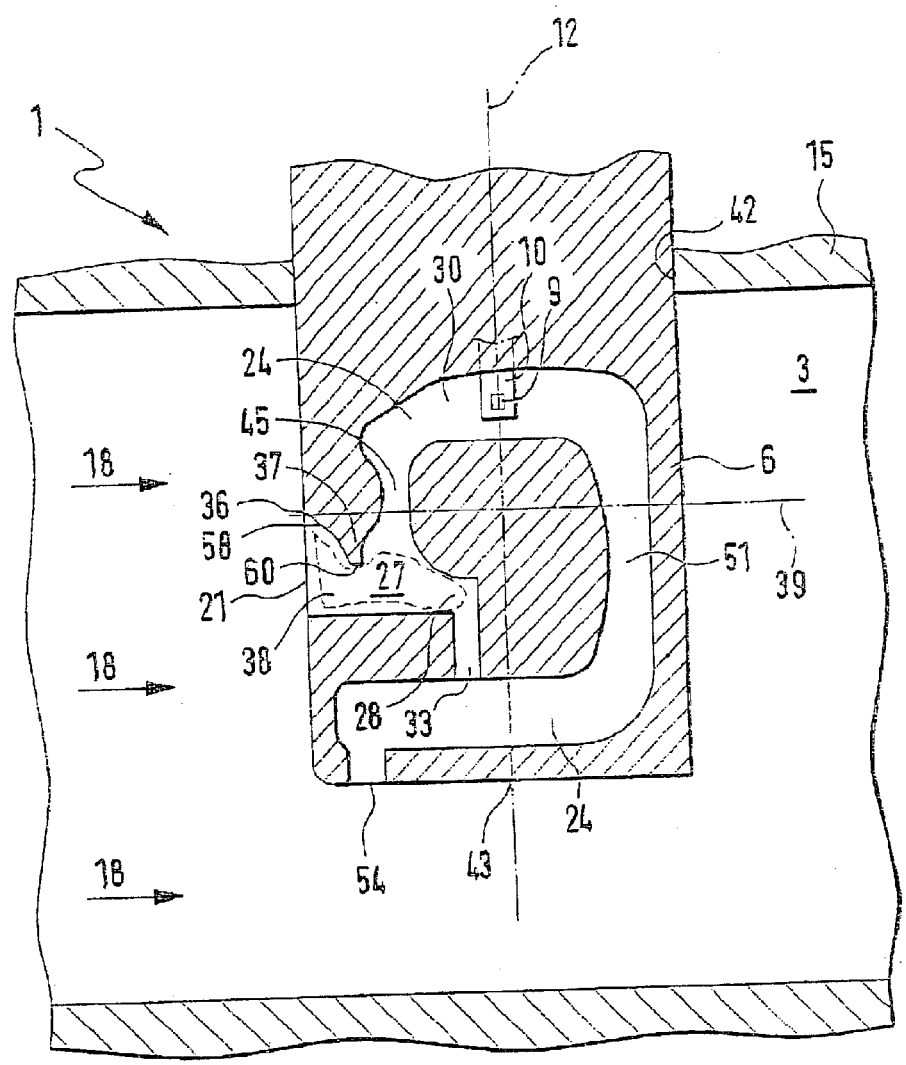
FIG. 2 shows a second exemplary embodiment of a device designed according to the present invention.

FIG. 2 shows a second exemplary embodiment of device 1 according to the present invention. In this exemplary embodiment, for example, no second tapering is provided in the region of measuring element 9. The cross section of bypass channel 24 tapers starting from intake port 21 in main flow direction 18. Downstream from intake port 21 in the region of upper plane 39 at a bypass channel inside area 58, a tear-off edge 60 is present which points toward the axial end 43. Liquid particles flowing into bypass channel 24 may form a film on an inner wall 58 of bypass channel 24, which may also reach into measuring channel 30, for example, counter to gravity. In order to avoid this, tear-off edge 60 is positioned in the region of a measuring channel intake port 63, which has the effect that a possibly present liquid film tears off from the wall, and no liquid film can reach into measuring channel 30. The liquid particles, which are generated by the tearing off of the liquid film at tear-off edge 60, because of the design of input region 27 in the region of intake port 21, flow in the direction of separation opening 33. Separation opening 33 in this exemplary embodiment combines input region 27 with deflecting channel 51.

Figure 3:
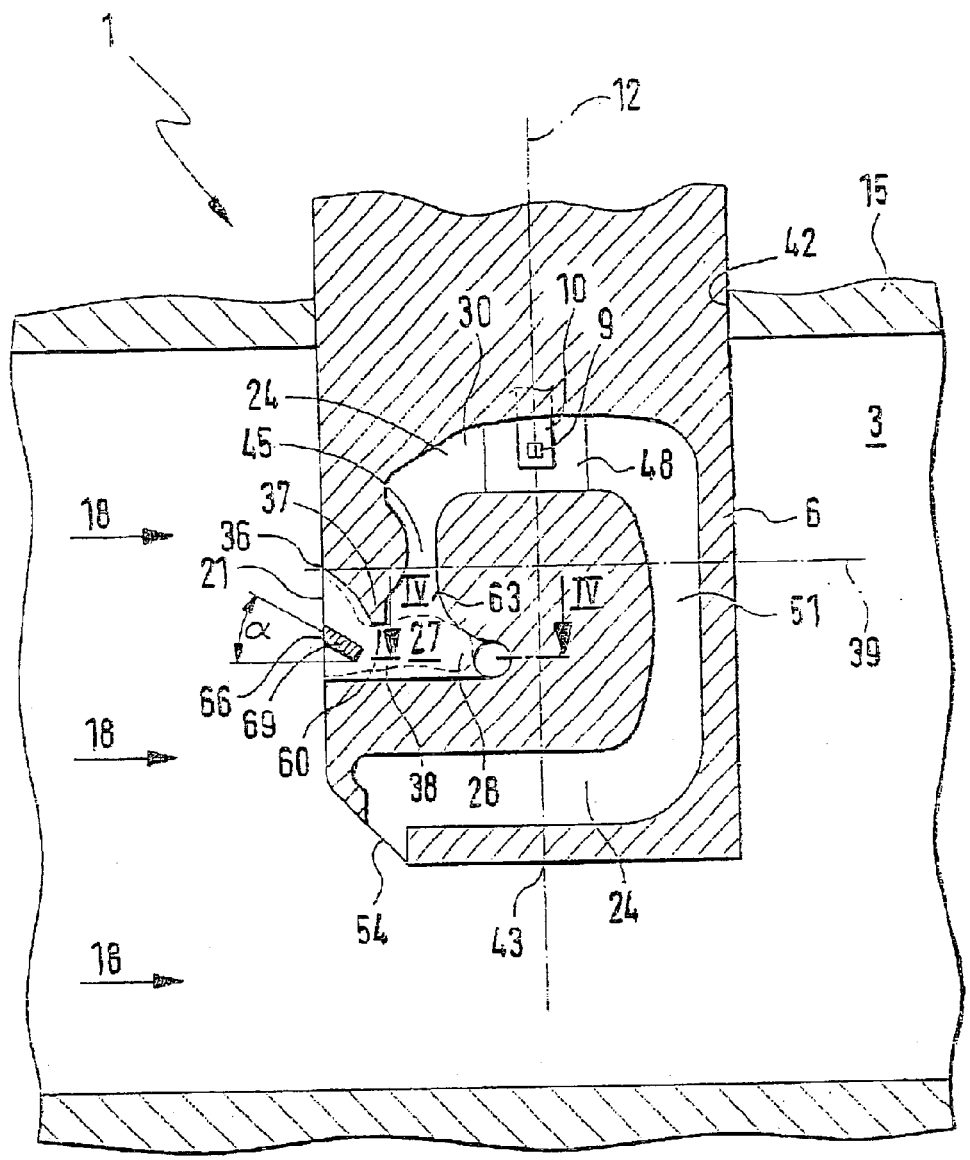
FIG. 3 shows a third exemplary embodiment of a device designed according to the present invention.

FIG. 3 shows a third exemplary embodiment of device 1 according to the present invention. In input region 27 at least one separating wall 69 is situated, which extends, starting from intake port 21 or also upstream from intake port 21, at least partially into input region 27. Separating wall 16, designed, for example, as a platelet, upstream has a separation point 66, and forms an angle of intersection a with main flow direction 18, that is different from zero degrees. Because of the crosswise placement of separating wall 69 to the flowing medium, the medium flowing into intake port 21 is steered away in a controlled manner from measuring channel opening 63 and steered toward separation opening 33. It is thus achieved in a reinforced manner that the liquid and solid particles cannot get into measuring channel 30.

In the individual figures the same and equally functioning parts are marked by the same reference numerals.

Figure 4:
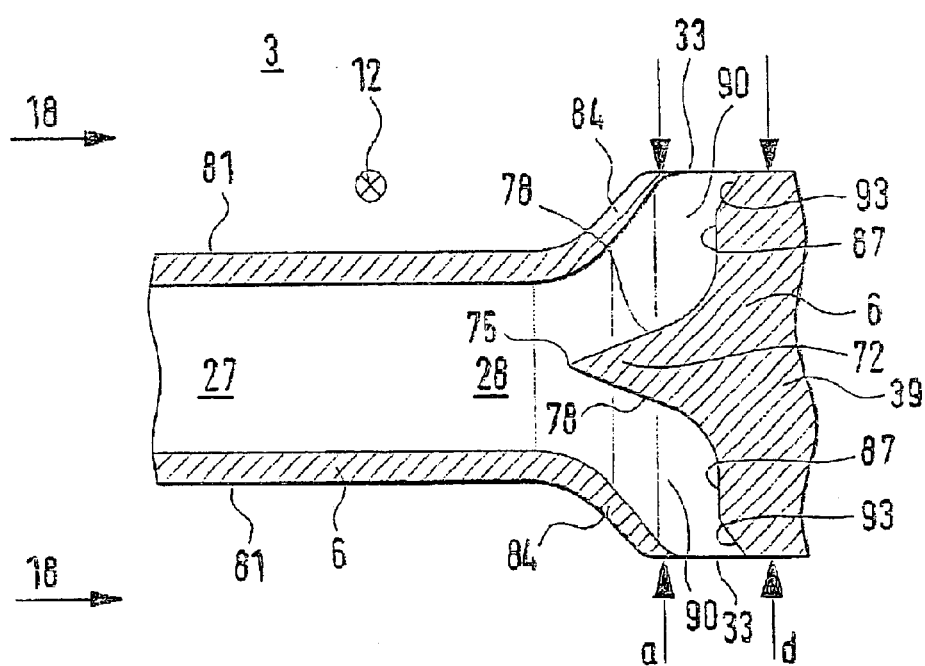
FIG. 4 shows a section along the line IV—IV in FIG. 3.

In a section along line IV—IV of FIG. 3, FIG. 4 shows a further exemplary embodiment of a device 1 designed according to the present invention.

In downstream region 28 of input region 27 a wedge 72 is positioned on a measuring housing inner wall 87, which, for example, lies in projection in main flow direction 18 of intake port 21. Measuring housing inner wall 87 is in any case situated in the vicinity of separation opening 33. Wedge 72, in a section perpendicular to center axis 12, has, for example a triangular cross section. However, side areas 78 of wedge 72 may also be curved in a concave manner. At the upstream end of wedge 72, for example, there is present at least one tip 75. On account of wedge 72 and/or tip 75 it is prevented that water or solid particles are able to collect at a baffle plate, i.e. at a measuring housing inner wall 87 according to the related art without wedge in downstream region 28, because wedge 72 and/or tip 75 prevent a wall film from forming. Likewise on account of wedge 78, a deflection of water particles or solid particles to separation openings 33 takes place. Furthermore, on account of the setting of a suction effect it is achieved that water and/or solid particles are sucked out from downstream end 28 of input region 27 in a reinforced manner. This happens among other things, because at an outer side surface 81 of measuring housing 6, upstream from separation opening 33, at least one projection 84 is formed at the side surface 81. The outer surface of projection 84 is designed, for example, flow line-shaped or curved. In the region of separation opening 33 the projection is designed so that an underpressure region (detaching) is generated, and thereby a suction effect on the flow is present in downstream region 28 of input region 27. In this context, for example, a separation channel 90 in downstream region 28 toward each separation opening 33 is designed so that it effects an acceleration of the flow in downstream region 28.

Measuring housing inner wall 87, for example, in the region of separation opening 33, has a chamfer 93 inclined in the flow direction, which diminishes the area of measuring housing inner wall 87, on which water and/or solid particles could deposit.

Separation opening 33 may form any desired angle with main flow direction 18. This may be set, for example, in that a thickness d of measuring housing 6 at the downstream end of separation opening 33, which runs perpendicular to center axis 12 and perpendicular to flow direction 18, is selectively set with respect to a dimension a of measuring housing 6 running in the same direction upstream from separation opening 33.

What is claimed is:

1. A device for determining at least one parameter of a flowing medium in a line, comprising:
    at least one measuring element circumflowed by the flowing medium; and
    a bypass channel including:
        at least one intake port connected to the line;
        at least one exit opening out into the line;
        a measuring channel in which the at least one measuring element is situated; and
        an input region situated downstream after the at least one intake port, wherein:
    the flowing medium subdivides completely in the input region into a first partial flow and a second partial flow,
    the first partial flow flows completely into the measuring channel,
    the second partial flow flows completely through at least one separation opening,
    the at least one intake port, in an axial direction that runs perpendicular to a main flow direction, includes an upper boundary edge that is closest to the at least one measuring element,
    an upper plane, which lies perpendicular to the axial direction and parallel to the main flow direction, runs through the upper boundary edge of the at least one intake port, and
    in the bypass channel the at least one separation opening is present, which in the axial direction is farther removed from the at least one measuring element than the upper plane.

2. The device as recited in claim 1, wherein:
the device is for determining an intake air mass of an internal combustion machine in the main flow direction.

3. The device as recited in claim 1, wherein:
the bypass channel includes at least one separation point one of in and downstream from the at least one intake port.

4. The device as recited in claim 1, wherein:
in the input region a tear-off edge is present.

5. The device as recited in claim 1, wherein:
the measuring channel tapers in a region of the at least one measuring element.

6. The device as recited in claim 1, wherein:
the at least one separation opening connects the input region to the line.

7. The device as recited in claim 1, wherein:
a plane, in which the at least one separation opening lies, is situated at an angle differing from zero degrees to the main flow direction.

8. The device as recited in claim 7, wherein:
the main flow direction runs in the plane in which the at least one separation opening lies.

9. The device as recited in claim 1, wherein:
the main flow direction runs in a plane of the at least one exit.

10. The device as recited in claim 1, wherein:
a plane of the at least one exit is positioned in the line at an angle differing from zero degrees to the main flow direction.

11. The device as recited in claim 1, further comprising:
a deflection channel connected to the measuring channel, wherein:
the measuring channel and the deflection channel are formed C-shaped, an opening of the C-shape facing the main flow direction.

12. The device as recited in claim 1, wherein:
the bypass channel is formed as a deflecting element downstream from the at least one intake port.

13. The device as recited in claim 12, wherein:
as the deflecting element, a lip is situated downstream from the at least one intake port in the bypass channel.

14. The device as recited in claim 1, further comprising:
at least one wedge situated in a downstream region of the input region.

15. The device as recited in claim 14, wherein:
the at least one wedge includes at least one tip at an upstream end.

16. The device as recited in claim 1, wherein:
the bypass channel is situated in a measuring housing, and
at least one projection is situated upstream from the at least one separation opening on at least one outer side surface of the measuring housing.

17. The device as recited in claim 1, wherein:
the flowing medium flows in the main flow direction, and
the main flow direction runs in a plane of the at least one separation opening.

18. The device as recited in claim 1, wherein:
the flowing medium flows in the main flow direction, and
the main flow direction forms an intersecting angle with the at least one separation opening that is different from zero.

19. The device as recited in claim 14, wherein:
the at least one wedge has a triangular cross section.

20. The device as recited in claim 14, wherein:
a side surface of the at least one wedge is concavely curved.

21. The device as recited in claim 14, wherein:
an inner wall of the measuring housing includes a chamfer in a region of the at least one separation opening.

22. A device for determining at least one parameter of a flowing medium in a line in a main flow direction, comprising:
   at least one measuring element circumflowed by the flowing medium; and
   a bypass channel including:
      at least one intake port connected to the line;
      at least one exit opening out into the line;
      a measuring channel in which the at least one measuring element is situated; and
      an input region situated downstream after the at least one intake port, wherein: the flowing medium subdivides completely in the input region into a first partial flow and a second partial flow, the first partial flow flows completely into the measuring channel, the second partial flow flows completely through at least one separation opening; a downstream region of the input region ends at a measuring housing inner wall disposed in a projection of the intake port in the main flow direction; and the at least one separation opening opens in a vicinity of the housing inner wall into the line.

* * * * *

UNITED STATES PATENT AND TRADEMARK OFFICE
CERTIFICATE OF CORRECTION

PATENT NO. : 6,915,682 B2
DATED : July 12, 2005
INVENTOR(S) : Renninger et al.

It is certified that error appears in the above-identified patent and that said Letters Patent is hereby corrected as shown below:

<u>Column 1,</u>
Line 5, delete "is application".

Signed and Sealed this

First Day of November, 2005

JON W. DUDAS
*Director of the United States Patent and Trademark Office*